(12) United States Patent
Hwang et al.

(10) Patent No.: US 7,670,134 B2
(45) Date of Patent: Mar. 2, 2010

(54) INJECTION MOLDING APPARATUS (75) Inventors: Han Sub Hwang, Suwon-si (KR); Sung Ki Min, Suwon-si (KR); Sang Hun Lee, Seoul (KR); Jong Won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 11/874,302

(22) Filed: Oct. 18, 2007

(65) Prior Publication Data
US 2008/0175946 A1 Jul. 24, 2008

(30) Foreign Application Priority Data
Jan. 22, 2007 (KR) .................. 10-2007-0006606

(51) Int. Cl.
*B29C 45/56* (2006.01)
*B29C 45/66* (2006.01)
(52) U.S. Cl. ................ 425/589; 425/590; 425/595; 425/450.1; 425/451.7; 425/451.9
(58) Field of Classification Search ............. 425/451.2, 425/451.7, 451.9, 589, 590, 595, DIG. 221, 425/DIG. 127, DIG. 129, 450.1, DIG. 58
See application file for complete search history.

(56) References Cited

U.S. PATENT DOCUMENTS 3,718,420 A * 2/1973 Florjancic ............ 425/DIG. 58
3,811,645 A * 5/1974 Feist ..................... 425/438
4,243,456 A * 1/1981 Cesano .................. 425/302.1
5,234,329 A * 8/1993 Vandenberg ............. 425/577
7,144,244 B1 * 12/2006 Ogawa et al. ............ 425/408
2005/0189665 A1 9/2005 Nishigaki

FOREIGN PATENT DOCUMENTS

| CN | 1669770 A | 9/2005 |
| EP | 0324235 A2 | 7/1989 |
| JP | 2001-018229 A | 1/2001 |
| WO | 03031143 A1 | 4/2003 |
| WO | 2005120803 A1 | 12/2005 |

* cited by examiner

*Primary Examiner*—Yogendra Gupta
*Assistant Examiner*—Thu Khanh T Nguyen
(74) *Attorney, Agent, or Firm*—Sughrue Mion, PLLC (57) ABSTRACT An injection molding apparatus capable of minimizing cracks at the corners of a mold is provided. The injection molding apparatus includes first and second molds that mate with each other to define a molding cavity, a stationary member that supports the first mold, a movable member that supports the second mold and moves backwards and forwards together with the second mold, and a plurality of pressing members installed around the first mold so as to press a periphery of the first mold toward the molding cavity by a pressing force of the movable member when the first mold is mated with the second mold.

9 Claims, 7 Drawing Sheets

INJECTION MOLDING APPARATUS

CROSS-REFERENCE TO RELATED APPLICATIONS

This application claims priority from Korean Patent Application No. 10-2007-0006606, filed on Jan. 22, 2007, in the Korean Intellectual Property Office, the disclosure of which is incorporated herein by reference.

BACKGROUND OF THE INVENTION

1. Field of the Invention

Apparatuses consistent with the present invention relate generally to an injection molding apparatus and, more particularly, to an injection molding apparatus capable of minimizing cracks at the corners of a mold.

2. Description of the Related Art

Recently, the technologies of rapidly heating or cooling a mold in the molding process in order to reduce a molding time and simultaneously produce a good molding have been proposed in the mold field.

As an example, a mold disclosed in Japanese Patent Publication No. 2001-18229 is designed to alternately introduce a heating medium and a cooling medium into a channel in the mold, thereby rapidly heating or cooling the mold. When fused resin is injected into the mold, the fluidity of the fused resin is increased by rapidly heating the mold to increase the temperature of the mold. Thereby, the resin is easily injected and a weld line is not formed in the molding. Further, after the fused resin is injected, the mold is rapidly cooled to reduce a solidification time, and thus a formation cycle is reduced.

However, because the mold is rapidly heated and then cooled in the molding process, high tensile stress repeatedly acts on corners of the mold, so that the corners of the mold undergo cracking. In other words, because the force is greatly applied from the inside to the outside of the mold by means of injection pressure and thermal expansion of the fused resin when the mold is heated, the high tensile stress is applied to the corners of the mold. When the mold is cooled, the tensile stress of the corners of the mold is released by contraction of the resin. This phenomenon causes the cracks at the corners of the mold.

SUMMARY OF THE INVENTION

Accordingly, the present invention has been made to address above-mentioned problems occurring in the related art, and an aspect of the present invention is to provide an injection molding apparatus capable of minimizing cracks at the corners of a mold.

Consistent with an exemplary embodiment of the present invention, there is provided an injection molding apparatus, which includes first and second molds mating with each other to define a molding cavity, a stationary member supporting the first mold, a movable member supporting the second mold and moving backwards and forwards together with the second mold, and a plurality of pressing members installed around the first mold so as to press a periphery of the first mold toward the molding cavity by means of a pressing force of the movable member when the first mold is mated with the second mold.

Here, the pressing members may each be installed so as to move backwards and forwards in a moving direction of the first mold, and a pressing face that is inclined to the moving direction at the periphery of the first mold in order to press the periphery of the first mold.

Further, the periphery of the first mold may include support faces that are inclined parallel to the pressing faces so as to correspond to the pressing faces.

Further, the pressing members may be spaced apart from corners of the first mold.

Also, the stationary member may include a plurality of support pins that are installed to movably support the pressing members, and a plurality of support springs that are installed to press the plurality of pressing members in a direction separated from the first mold when the second mold is separated from the first mold.

Further, at least one of the first mold and the second mold may include at least one fluid channel into which a heating medium and a cooling medium are selectively introduced.

In addition, any one of the first mold and the second mold may be heated by the heating medium such that the pressure of resin acting on an inner surface of the molding cavity is balanced with force with which the pressing members press the periphery of the first mold.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

Figure 1:
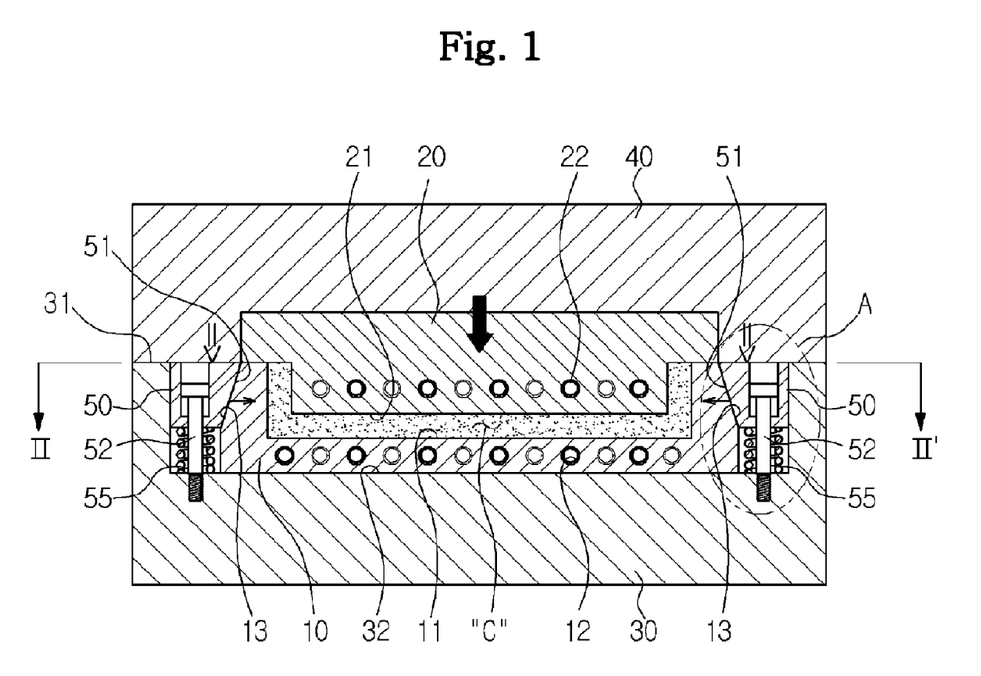
FIG. 1 is a sectional view illustrating an injection molding apparatus consistent with the present invention, in which a first mold is mated with a second mold.
Figure 4:
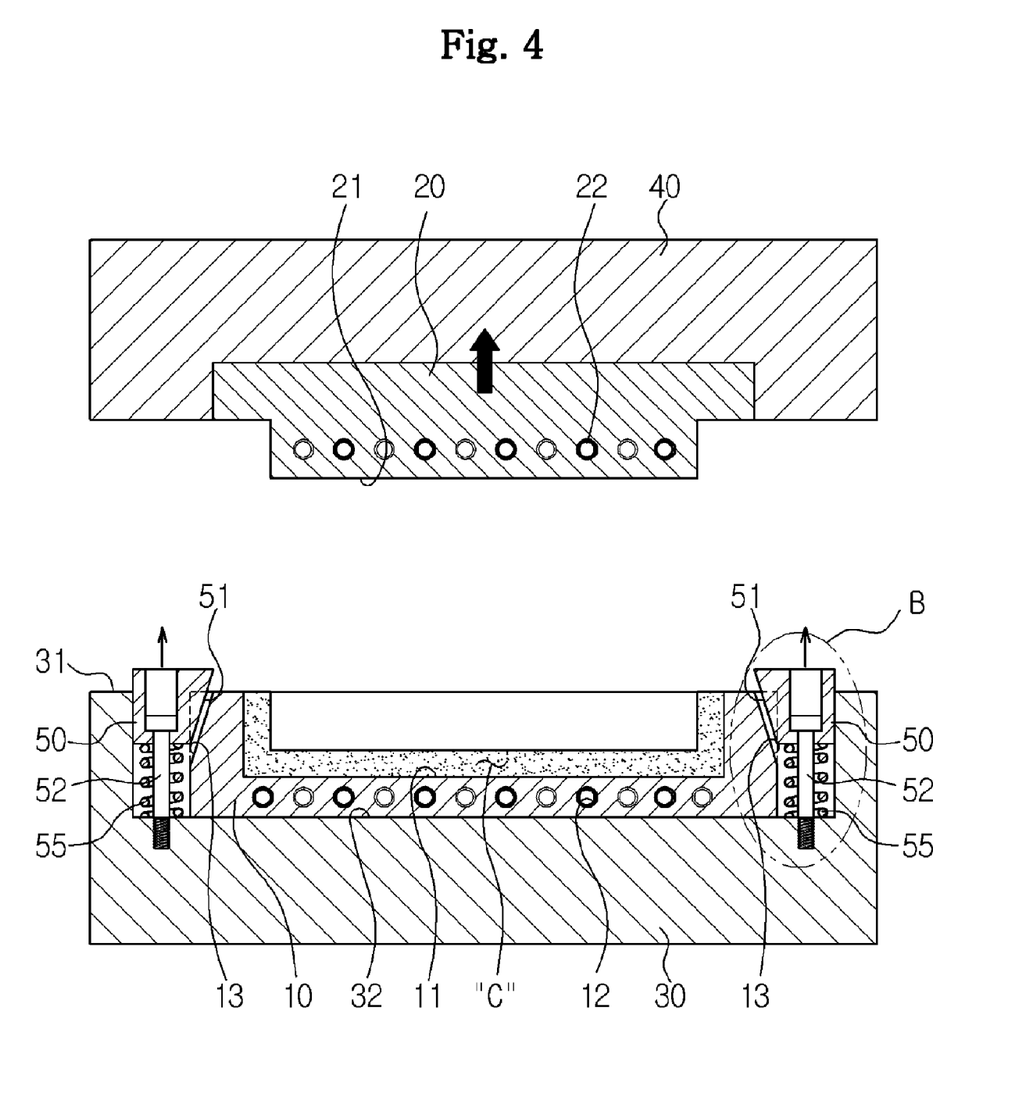
FIG. 4 is a sectional view illustrating an injection molding apparatus consistent with the present invention, in which a first mold is separated from a second mold.

As illustrated in FIGS. 1 and 4, an injection molding apparatus according to the present invention first and second molds 10 and 20 mating with each other to define a molding cavity C, a stationary member 30 supporting the first mold 10, and a movable member 40 supporting the second mold 20 and moving backwards and forwards together with the second mold 20.

Figure 2:
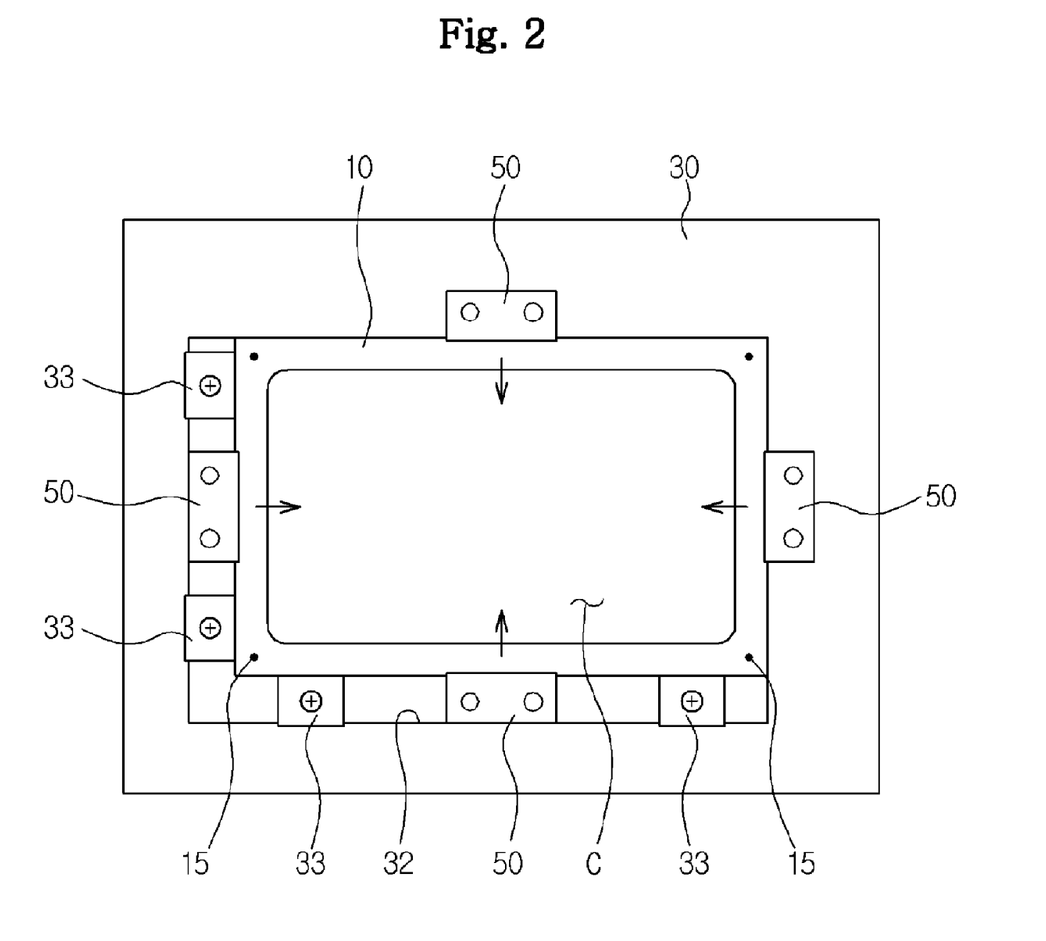
FIG. 2 is a sectional view taken line II-II' of FIG. 1.

The stationary member 30 is provided with a mold installation space 32 recessed from a mating face 31 mated with the movable member 40 so as to be able to receive and fix the first mold 10 therein. As illustrated in FIGS. 1 and 2, the first mold 10 is fixed by tapered fixing blocks 33 installed therearound after received in the mold installation space 32. The second mold 20 is fixed to the movable member 40 so as to be able to define the molding cavity C together with the first mold 10, thereby moving backwards and forwards (up and down) together with the movable member 40.

As illustrated in FIG. 1, the first mold 10 includes an outer surface molding section 11 recessed from the mating face mated with the second mold 20 in order to form the outer surface of a molding, and the second mold 20 includes an inner surface molding section 21 protruding from the mating face mated with the first mold 10 in order to form an inner surface of the molding.

The first mold 10 and the second mold 20 are provided with a plurality of fluid channels 12 and 22, respectively, into which a heating medium and a cooling medium are alternately introduced so as to be able to rapidly heat and cool the first mold 10 and the second mold 20 in the molding process. The heating medium introduced into the fluid channels 12 and 22 may include high-temperature liquid or steam, and the cooling medium may include cold liquid such as cold oil or water.

When fused resin is injected into the molding cavity C, the heating medium is adapted to be introduced into the fluid channels 12 and 22 of the first and second molds 10 and 20, thereby heating the first and second molds 10 and 20 at a temperature between about 100° C. and about 130° C. This heating causes the fluidity of the fused resin to be increased, thereby facilitating the injection of the fused resin into the molding cavity C and preventing a weld line from being formed in the molding. Further, when the fused resin is injected into and solidified in the molding cavity C, the cooling medium is introduced into the fluid channels 12 and 22 of the first and second molds 10 and 20, thereby rapidly cooling the first and second molds 10 and 20 at a temperature between about 50° C. and about 70° C. to thus reduce a molding time. The exemplary embodiment of FIG. 1 shows, but is not limited to, the case of heating the first and second molds 10 and 20 using a fluid heating medium. Alternatively, the first and second molds 10 and 20 may be heated by electric heaters, which are buried in the first and second molds 10 and 20.

Figure 3:
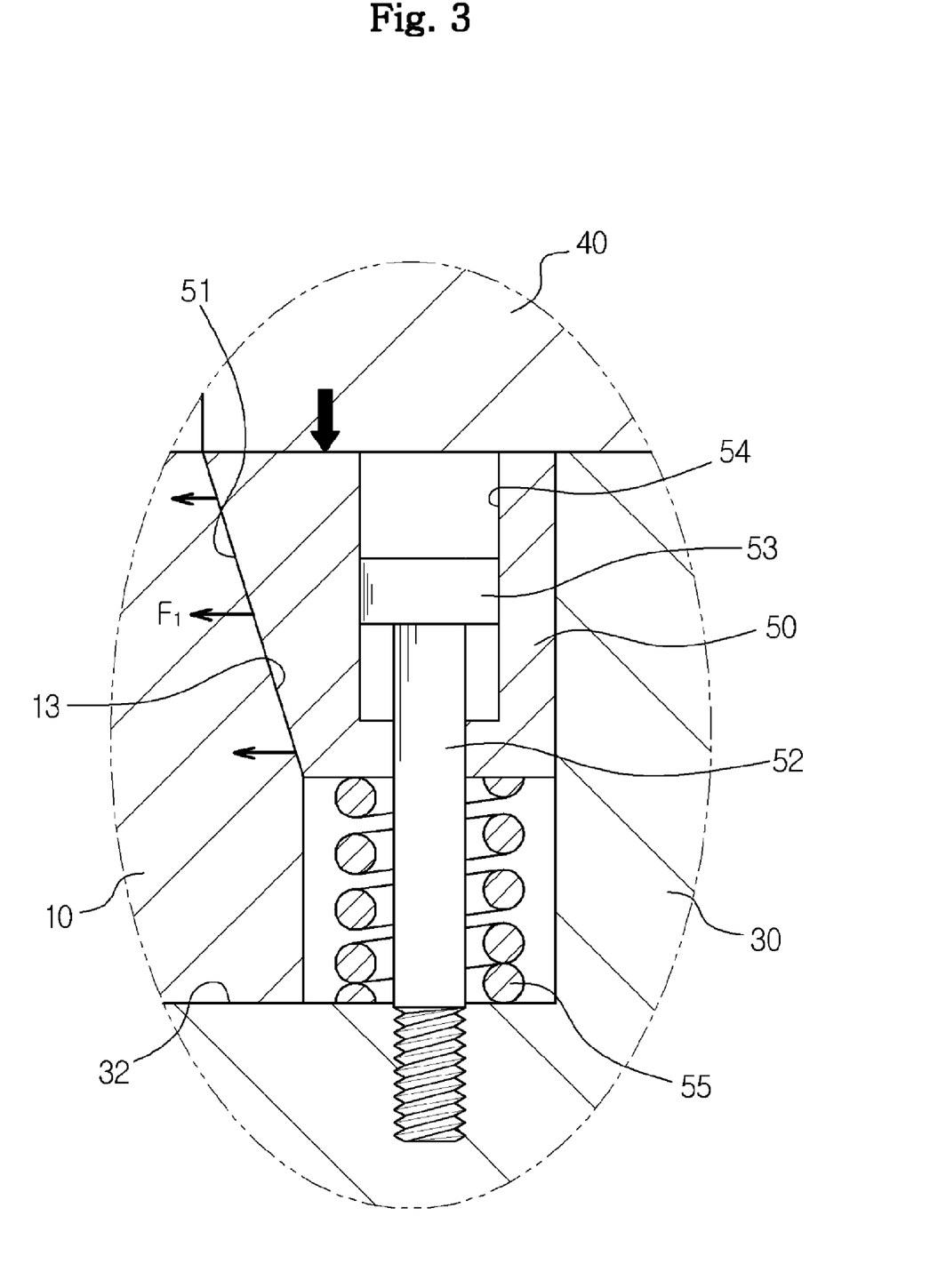
FIG. 3 is an enlarged view of part A of FIG. 1.

As illustrated in FIGS. 1, 2 and 3, a plurality of pressing members 50 for pressing a periphery of the first mold 10 toward the molding cavity C when the first mold 10 is mated with the second mold 20 by means of the operation of the movable member 40 are installed outside the first mold 10. Each pressing member 50 is disposed outside the intermediate portion, preferably, but not necessarily, the middle portion, between the neighboring corners of the first mold 10 while being spaced apart from each corner of the first mold by a predetermined distance, and is installed so as to be movable backwards and forwards in a pressing direction of the movable member 40. Further, each pressing member 50 has the shape of a quadrilateral block, and is provided with a pressing face 51 that is inclined to the moving direction at the periphery of the first mold 10 in order to press the periphery of the first mold 10. The periphery of the first mold 10 is provided with support faces 13, which are inclined parallel to the pressing faces 51 so as to correspond to the pressing faces 51 of the pressing members 50. This functions to allow the pressing faces 51 of the pressing members 50 to press the support faces 13 of the first mold 10 toward the molding cavity C when the pressing members 50 are pressed by the movable member 40.

Figure 5:
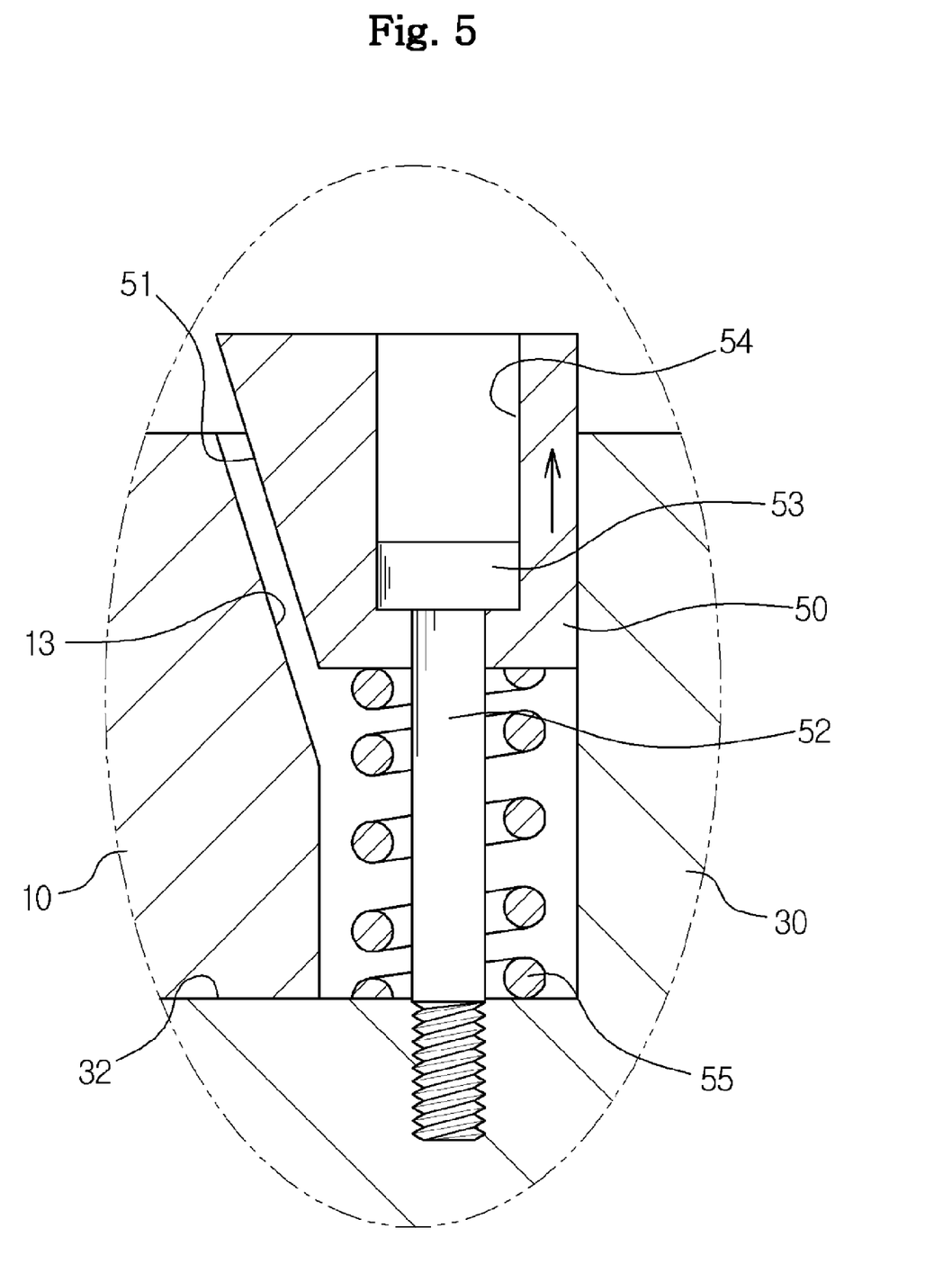
FIG. 5 is an enlarged view of part B of FIG. 4.

The stationary member 30 is provided with a plurality of support pins 52, which are elongated in the moving direction of the pressing members 50 in order to movably support the pressing members 50 and pass through the respective pressing members 50. Further, as illustrated in FIG. 4, each support pin 52 is fitted around by a spring 55, which separates each pressing member 50 from the first mold 10 when the second mold 20 is separated from the first mold 10. As illustrated in FIG. 5, the springs 55 fitted around the support pins 52 press the pressing members 50, thereby causing the pressing members 50 to be separated from the first mold 10. Each pressing member 50 is provided with a movement guide hole 54, which receives a head 53 of each support pin 52 and simultaneously guides each pressing member 50 to move backwards and forwards.

The operation of the injection molding apparatus will be described below.

As illustrated in FIG. 1, when the first mold 10 cooperates with the second mold 20 by moving the movable member 40 toward the second mold 20, a molding cavity C for producing a resin molding is defined. As illustrated in FIG. 3, at this time, because the pressing members 50 are pressed by the movable member 40, the pressing faces 51 of the pressing members 50 press the support faces 13 of the first mold 10 toward the molding cavity C. Therefore, the periphery of the first mold 10 is slightly deformed toward the molding cavity C, and thus each corner 15 is subject to compressive stress.

In this state, fused resin is injected into the molding cavity C, and a heating medium (e.g., steam) is supplied into the fluid channels 12 and 22 of the first and second molds 10 and 20, thereby rapidly heating the first and second molds 10 and 20 at a temperature between about 100° C. and about 130° C. When the first and second molds 10 and 20 are heated by the heating medium, the fluidity of the fused resin injected into the molding cavity C is increased, so that the fused resin is uniformly injected into the entire molding cavity C. Further, because the fluidity of the fused resin is increased, a weld line of the molding caused by a speed difference generated when the fused resin is diffused in the molding cavity C is not generated.

Figure 6:
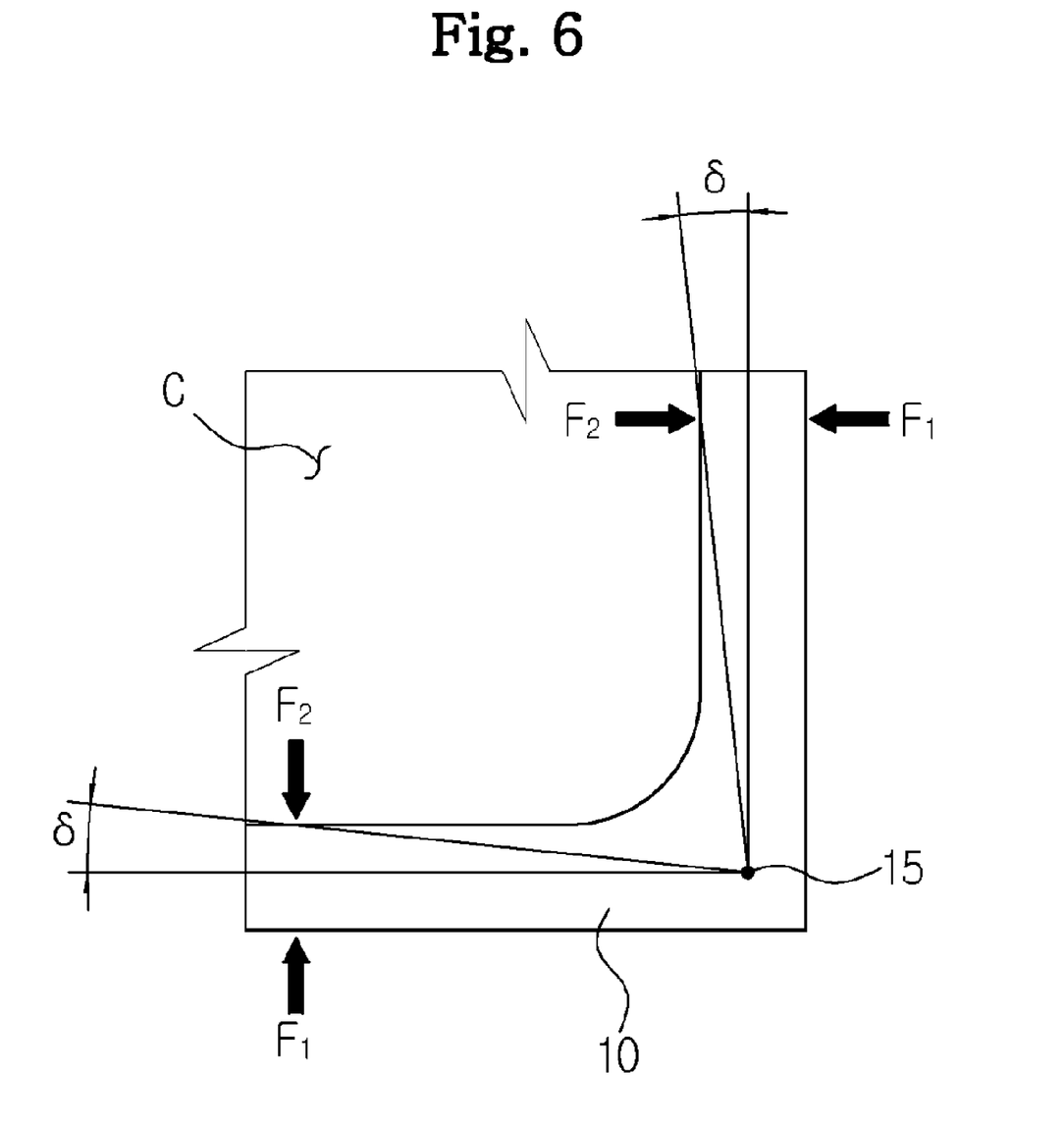
FIG. 6 illustrates the change in force acting on a first mold in the molding process of an injection molding apparatus consistent with the present invention.

When the fused resin is injected, injection pressure and temperature of the molds are increased to expand the fused resin, and thus the pressure in the molding cavity C is increased, as illustrated in FIG. 6. For this reason, pressing force $F_2$ acts on the inner surface of the molding cavity C in an outward direction. However, the pressing force $F_2$ is offset by force $F_1$ generated when the pressing members 50 press the periphery of the first mold 10 toward the molding cavity C. In other words, the forces $F_1$ and $F_2$ acting inside and outside the first mold 10 are in equilibrium, so that the first mold 10 is hardly changed from an initial state, and thus the compressive stress of each corner 15 is reduced.

When a cooling medium is supplied into the fluid channels 12 and 22 of the first and second molds 10 and 20, the fused resin filled in the molding cavity C is solidified and contracted. Thus, the compressive stress caused by the pressing force $F_1$ of the pressing members 50 can be again generated at each corner 15 of the first mold 10.

As illustrated in FIGS. 4 and 5, when the second mold 20 is separated from the first mold 10 in order to extract the molding, the pressure of the pressing members 50 is released. At this time, the pressing members 50 move toward the movable member 40 by means of the elasticity of the springs 55, and thus are separated from the first mold 10. In other words, the pressing faces 51 of the pressing members 50 are separated from the support faces 13 of the first mold 10.

Figure 7:
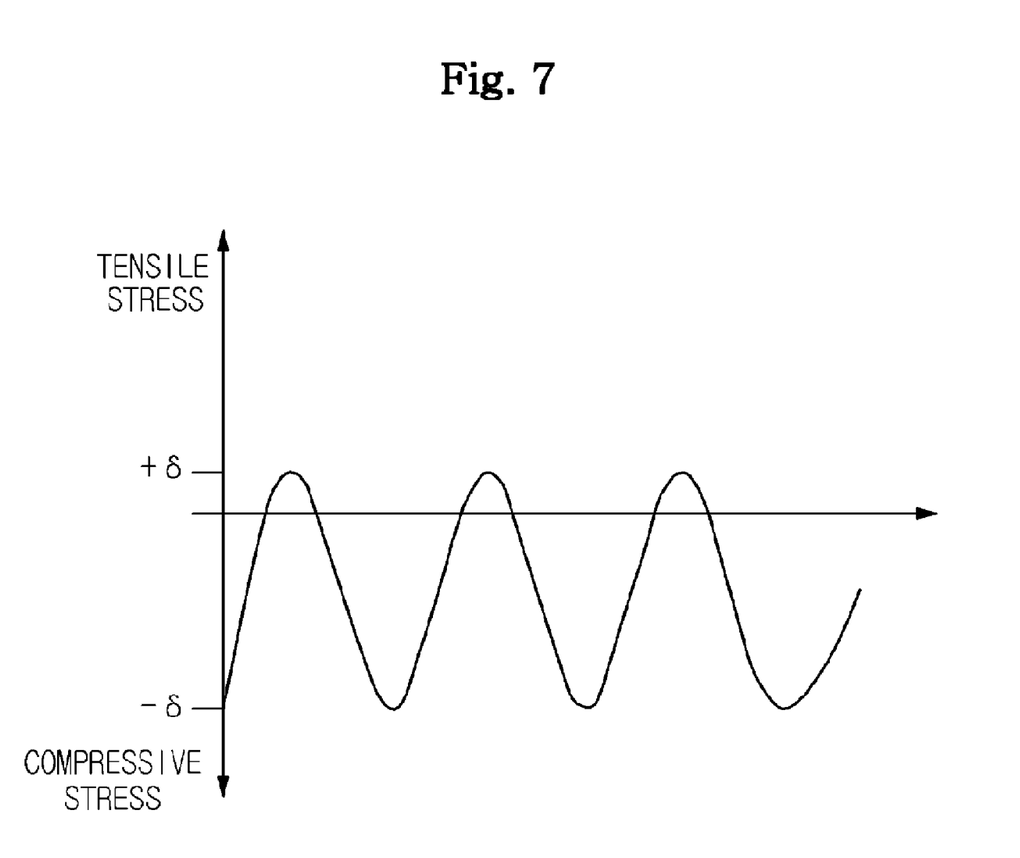
FIG. 7 is a diagram illustrating the change in stress acting on corners of a mold in the molding process of an injection molding apparatus consistent with the present invention.

When this molding process is repeated, the first mold 10 is repeatedly deformed by the change of the internal injection and expansion pressure $F_2$ and the external pressing force $F_1$. As such, the change in stress is generated at each corner 15 of the first mold 10 as illustrated in FIG. 7. In other words, the application and release of the compressive stress are repeated at each corner 15 of the first mold 10. The tensile stress acting on the corners 15 of the first mold 10 is insignificant. When the tensile stress repeatedly acts on the corners 15 due to the change in the pressure in the mold, cracks are caused in the corners 15 of the mold. However, the present invention can minimize the cracks at the corners 15 of the mold because the corners 15 of the first mold are mainly subject to the compressive stress but not to the tensile stress. In this manner, the compressive stress acting on the corners 15 does not have a great influence on the cracks.

As described in detail above, in the injection molding apparatus consistent with the present invention, when the first mold is mated with the second mold, the pressing members press the periphery of the first mold toward the molding cavity, and thus offset the force acting from the inside to the outside of the molding cavity as the pressure in the molding cavity is raised. As a result, the phenomenon in which the tensile stress is generated at the corners of the mold can be minimized, and thus the cracks at the corners of the mold can be minimized.

Although exemplary embodiments of the present invention have been described for illustrative purposes, those skilled in the art will appreciate that various modifications, additions and substitutions are possible, without departing from the spirit and scope of the invention as disclosed in the accompanying claims.

What is claimed is:

1. An injection molding apparatus comprising:
   first and second molds which mate with each other to define a molding cavity;
   a stationary member which supports the first mold;
   a movable member which supports the second mold and moves backwards and forwards together with the second mold; and
   a plurality of pressing members installed around the first mold so as to press a periphery of the first mold toward the molding cavity by a pressing force of the movable member when the first mold is mated with the second mold,
   wherein the pressing members are disposed to move backwards and forwards in the same or parallel to a moving direction of the second mold.

2. The injection molding apparatus as claimed in claim 1, wherein each of the pressing members includes a pressing face that is inclined to the moving direction at the periphery of the first mold in order to press the periphery of the first mold.

3. The injection molding apparatus as claimed in claim 2, wherein the periphery of the first mold includes support faces that are inclined parallel to the pressing faces so as to correspond to the pressing faces.

4. The injection molding apparatus as claimed in claim 2, wherein the pressing members are spaced apart from corners of the first mold.

5. The injection molding apparatus as claimed in claim 2, wherein the stationary member includes a plurality of support pins that are installed to movably support the pressing members, and a plurality of support springs that are installed to press the plurality of pressing members, respectively, in a direction separated from the first mold when the second mold is separated from the first mold.

6. The injection molding apparatus as claimed in claim 1, wherein at least one of the first mold and the second mold includes at least one fluid channel into which a heating medium and a cooling medium are selectively introduced.

7. The injection molding apparatus as claimed in claim 6, wherein any one of the first mold and the second mold is heated by the heating medium such that a pressure of resin acting on an inner surface of the molding cavity is balanced with a force with which the pressing members press the periphery of the first mold.

8. The injection molding apparatus as claimed in claim 2, wherein the pressing face of each pressing member faces towards the molding cavity.

9. The injection molding apparatus as claimed in claim 2, wherein the pressing members are positioned such that the pressing face is disposed entirely within a height of the first mold when the first mold is mated with the second mold.

* * * * *